United States Patent
Noguchi et al.

(10) Patent No.: US 7,441,796 B2
(45) Date of Patent: Oct. 28, 2008

(54) AIRBAG SYSTEM

(75) Inventors: Atsushi Noguchi, Moriyama (JP); Kenji Hiraoka, Hiroshima (JP)

(73) Assignee: Takata Corporation, Tokyo (JP)

( * ) Notice: Subject to any disclaimer, the term of this patent is extended or adjusted under 35 U.S.C. 154(b) by 347 days.

(21) Appl. No.: 11/113,146

(22) Filed: Apr. 25, 2005

(65) Prior Publication Data

US 2005/0242551 A1 Nov. 3, 2005

(30) Foreign Application Priority Data

Apr. 28, 2004 (JP) ............................. 2004-134392

(51) Int. Cl.
*B60R 21/16* (2006.01)
(52) U.S. Cl. .................. 280/730.2; 280/743.1; 280/749
(58) Field of Classification Search ............... 280/730.2, 280/743.1, 728.1, 727, 729, 749
See application file for complete search history.

(56) References Cited

U.S. PATENT DOCUMENTS

| | | | | |
|---|---|---|---|---|
| 6,073,961 | A * | 6/2000 | Bailey et al. .............. | 280/730.2 |
| 6,082,761 | A * | 7/2000 | Kato et al. ................ | 280/730.2 |
| 6,110,094 | A | 8/2000 | Wallentin et al. | |
| 6,337,461 | B1 | 1/2002 | Yasuda et al. | |
| 6,371,512 | B1 | 4/2002 | Asano et al. | |
| 6,644,687 | B2 | 11/2003 | Saito et al. | |
| 6,758,490 | B2 | 7/2004 | Hoeft et al. | |
| 7,243,940 | B2 * | 7/2007 | Tesch et al. .............. | 280/728.1 |
| 2002/0036395 | A1 * | 3/2002 | Bakhsh et al. ............ | 280/730.2 |
| 2002/0158450 | A1 * | 10/2002 | Hoeft et al. .............. | 280/730.2 |
| 2002/0158451 | A1 | 10/2002 | Nusshor | |
| 2003/0116947 | A1 * | 6/2003 | Yokoyama et al. ........ | 280/730.2 |
| 2005/0206138 | A1 * | 9/2005 | Breuninger et al. ......... | 280/729 |

FOREIGN PATENT DOCUMENTS

| | | |
|---|---|---|
| JP | 2003-200809 | 7/2003 |
| JP | 2004-58848 | 2/2004 |
| JP | 2004-114829 A | 4/2004 |
| JP | 2004-142530 A | 5/2004 |
| JP | 2004-148916 A | 5/2004 |

\* cited by examiner

*Primary Examiner*—Eric Culbreth
(74) *Attorney, Agent, or Firm*—Manabu Kanesaka

(57) ABSTRACT

An airbag system includes at least an airbag and a gas supply device. The airbag is mounted to an upper part of a sidewall of a vehicle and has a function of protecting an occupant by inflating downwardly into an occupant protection region between the occupant and the sidewall of the vehicle in a car accident such as a side crash or rolling sideways. The gas supply device having a gas generating function supplies inflation gas to the airbag. The airbag has a folded portion and an extending portion. The folded portion is folded in a predetermined folded shape in advance. The extending portion extends downwardly along the folded portion so as to cover a side of the folded portion from an interior side of the vehicle when the airbag is mounted to the vehicle.

9 Claims, 11 Drawing Sheets

Front of vehicle

Rear of vehicle out of cabin

Upper part

Interior of cabin

Upper part ↑ → Interior of cabin

Upper part

Interior of cabin

Upper part

Interior of cabin

AIRBAG SYSTEM

BACKGROUND OF THE INVENTION AND RELATED ART STATEMENT

The present invention relates to an airbag system mounted to a vehicle such as a car, and in particular, relates to an airbag system for protecting an occupant from colliding with a sidewall of a vehicle in a car accident such as a side crash or rolling over.

Various airbag systems are proposed to protect occupants from colliding with a sidewall of a vehicle such as a side window or a door in a car accident such as a side crash or rolling sideways. Well-known airbag systems include an airbag system having an airbag accommodated along a side-roof rail of a car in a folded state in a roll shape (e.g., refer to Patent Document 1). Patent Document 1 discloses a technique of inflating an airbag smoothly by folding the airbag in a roll shape. However, in order to inflate an airbag quickly and reliably into an occupant protection region between the sidewall of the vehicle and an occupant, further improvement is necessary.

Patent Document 1: Japanese Patent Publication (Kokai) No. 2003-200809

In view of the above problems, an object of the invention is to provide an airbag system for protecting an occupant in a car accident.

Further objects and advantages of the invention will be apparent from the following description of the invention.

SUMMARY OF THE INVENTION

In order to achieve the above objects, according to the invention, an airbag system is mounted to various vehicles such as cars, trains, and vessels.

According to a first aspect of the invention, an air supply system comprises at least an airbag and a gas supply device. The airbag is mounted to an upper part of a sidewall of a vehicle and has a function of protecting an occupant by inflating downwardly into an occupant protection region between the occupant and the sidewall of the vehicle in a car accident such as a side crash or rolling sideways. The gas supply device such as an inflator having a gas generating function supplies inflation gas to the airbag. The vehicle sidewall broadly includes components of the vehicle located on a side (the right side and left side) of the occupant, typically, a side window and a door. The airbag is mounted to a boundary between a side roof panel at the upper part of the vehicle sidewall and a ceiling panel.

In particular, the airbag has a combined structure having a folded portion and an extending portion. The folded portion of the airbag is folded in a predetermined folded shape in advance, and may combine a rolled-up (folded) portion and a concertinas portion. That is, the folded portion includes a rolled portion, a concertinas portion, or a combination of a rolled portion and a concertinas portion. The extending portion of the airbag extends downwardly along the folded portion so as to cover a side of the folded portion from an interior side of the vehicle when the airbag is mounted to the vehicle. The extending portion has at least a portion extending downwardly from a base end to a distal end along the folded portion. The extending portion may extend downwardly from the base end to the distal end along the folded portion, and may be folded upwardly along the folded portion.

In the airbag with the structure described above, the extending portion extends downwardly and covers the folded portion from an interior side of the vehicle. Accordingly, the extending portion restrains the folded portion from deploying laterally at the upper part of the occupant protection region, while the extending portion allows the folded portion to deploy downwardly. In other words, the sidewall of the vehicle and the extending portion extend vertically, and define both sides of the folded portion to restrain the folded portion from inflating laterally. Accordingly, the folded portion is preferentially inflated (deployed) downwardly along the sidewall of the vehicle toward the occupant protection region. The term "restrain" represents restraint of the lateral inflating action of the folded portion so as to preferentially inflate the folded portion downwardly toward the occupant protection region, and is not limited to complete restraint of the lateral inflating action of the folded portion.

In the airbag system according to the first aspect, it is possible to quickly inflate the airbag along the vehicle sidewall into the occupant protection region, thereby securely protecting the occupant in a car accident.

According to a second aspect of the invention, in the airbag according to the first aspect, the extending portion includes a first extending portion extending above the folded portion and a second extending portion extending along the side of the folded portion. With the airbag having this structure, the lateral inflating action of the folded portion is restrained by the first extending portion, while the upward inflating action is restrained by the second extending portion. This further ensures the downward inflating action of the folded portion along the vehicle sidewall into the occupant protection region.

According to a third aspect of the invention, in the airbag according to the first or second aspect, the folded portion includes a rolled portion rolled upwardly. The airbag is inflated in a region corresponding to a head of the occupant in the occupant protection region, while the rolled portion is restrained by the extending portion from deploying from the upper part of the vehicle sidewall directly to the head of the occupant.

According to the invention, the rolled portion is formed by rolling the airbag upwardly (folded) into a roll shape, so that the airbag is effectively inflated in the occupant protection region such as the head of the occupant. With the airbag of this structure, the extending portion restrains the rolled portion, i.e., the folded portion, from deploying directly to the head of the occupant, so that the folded portion can be inflated in the protection region corresponding to the head of the occupant reliably and smoothly.

According to the invention, it is possible to modify the position and number of regions where the rolled portion, i.e., the folded portion, of the airbag is inflated. For example, in addition to the region corresponding to the head of the occupant, the rolled portion can also be inflated in a region corresponding to the region of the occupant which is to be protected reliably.

As described above, the airbag according to the present invention has a combination structure of the folded portion folded in a predetermined shape and the extending portion extending downwardly along the folded portion so as to cover the side of the folded portion from the interior side of the vehicle when the airbag is mounted to the vehicle. Accordingly, it is possible to inflate the airbag quickly and reliably in the occupant protection region between the vehicle sidewall and the occupant, thereby ensuring complete protection of the occupant in a car accident.

DETAILED DESCRIPTION OF PREFERRED EMBODIMENTS

Hereunder, embodiments of the present invention will be described with reference to the drawings. Referring to FIGS. 1 to 7, a structure and operation of an airbag system 100 according to an embodiment of the present invention will be described. In FIGS. 1 to 7, the airbag system 100 is mounted to a right side of a car body having two rows of seats.

Figure 1:
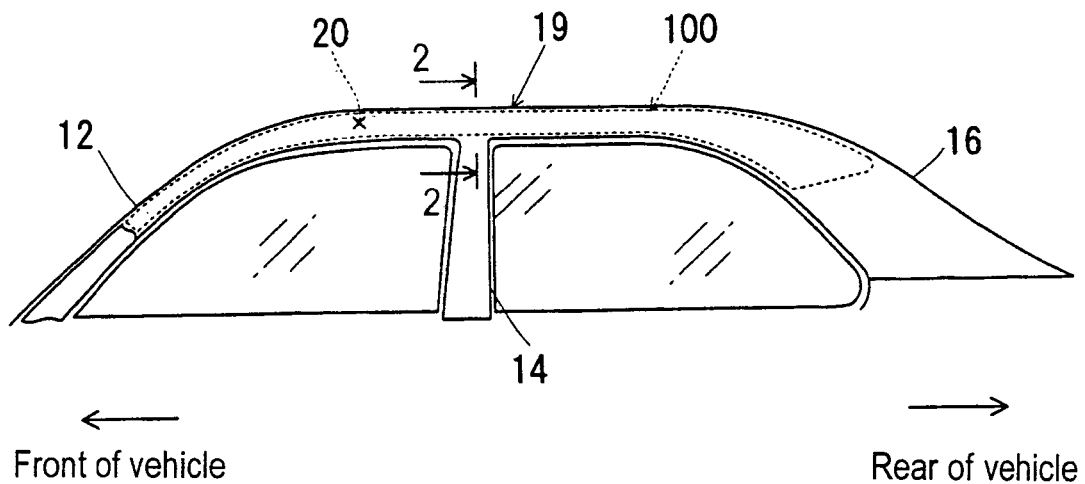
FIG. 1 is a schematic view showing an airbag system mounted to a car body according to an embodiment of the present invention.
Figure 2:
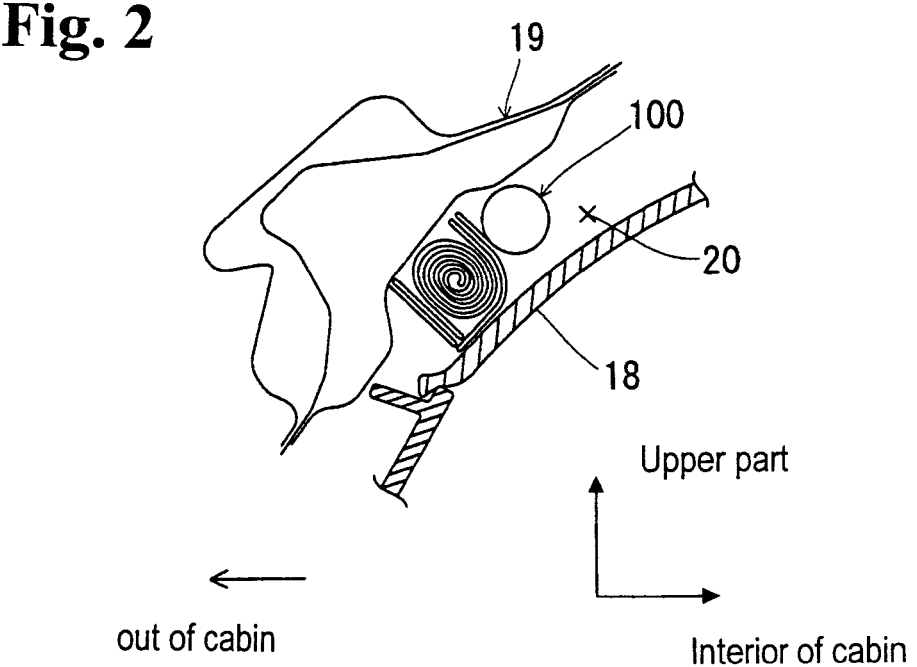
FIG. 2 is a cross sectional view of a center pillar (B-pillar) taken along line 2-2 in FIG. 1.

FIG. 1 schematically shows a state in which the airbag system 100 is mounted to the car body. FIG. 2 shows a cross-sectional structure of a center pillar (B-pillar) 14 taken along line 2-2 in FIG. 1. The airbag system 100 of FIG. 2 is in a state before activation (an initial state). In FIG. 1, the left side in the drawing is the front side of the car; the right side is the rear side of the car. FIG. 2 shows a right sidewall of the vehicle, in which the right side is an interior side of a cabin, and the left side is an exterior side of the cabin.

As shown in FIGS. 1 and 2, the airbag system 100 is disposed in a partitioned region 20 divided by a ceiling panel 18 and a right side roof rail (body panel) 19, and extends in the extending direction of the right side roof rail 19 from a front pillar (A-pillar) 12 to a rear pillar (C-pillar or D-pillar) 16. In other words, the airbag system 100 and an airbag 120, to be described later, are mounted to the upper part of the sidewall of the car.

Figure 3:
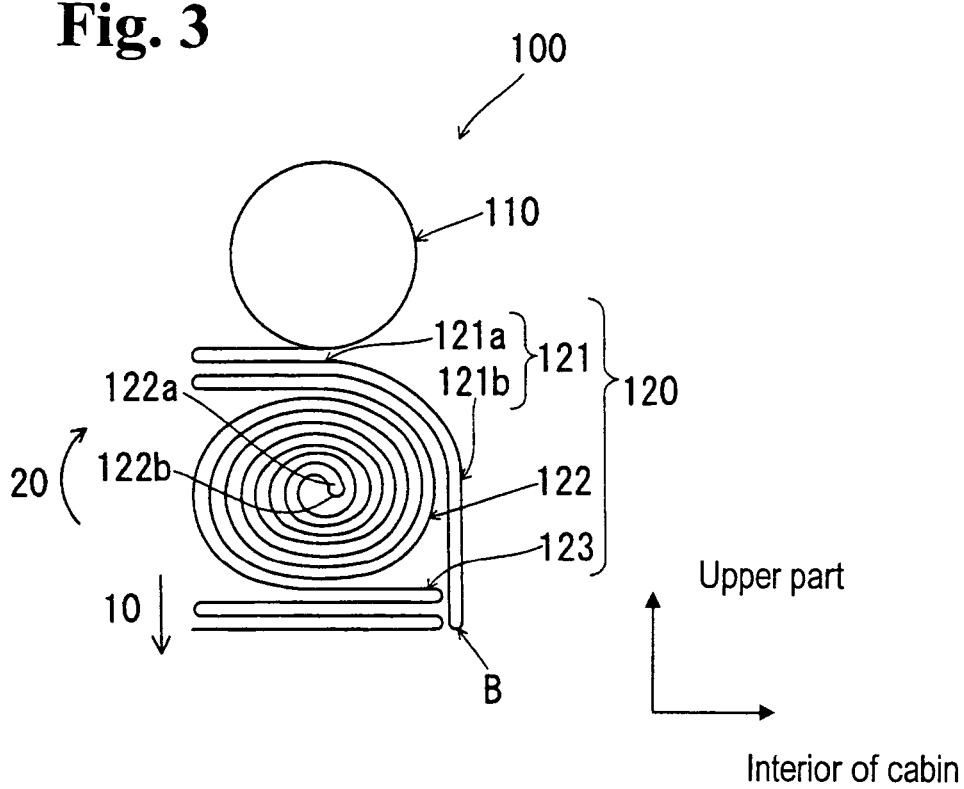
FIG. 3 is a schematic view showing an airbag of the airbag system shown in FIG. 2.

FIG. 3 shows a schematic structure of the airbag 120 of the airbag system 100 in FIG. 2. As will be described below in detail, the airbag system 100 has a function of protecting an occupant quickly and reliably in the event of car accidents such as a side crash or rolling sideways. The airbag system 100 in FIG. 3 is accommodated in the right sidewall of a car, in which the right side is the interior side of the cabin (the interior side of the car).

As shown in FIG. 3, the airbag system 100 is principally formed of the airbag 120 accommodated in a folded state in a predetermined shape in advance and an inflator (gas generator) 110 that can supply inflation gas into the inner space of the airbag 120. The inflator 110 of the embodiment corresponds to a gas supply device of the invention, and the airbag 120 of the embodiment corresponds to an airbag of the invention.

With the airbag system 100 mounted to the car body, the base end of the airbag 120 (adjacent to the inflator 110) is arranged approximately at the upper part, while the distal end of the airbag 120 is arranged approximately at the lower part. The airbag 120 is fixed to the right side roof rail 19 via a bracket 127, to be described later.

The inflator 110 is connected to the airbag 120 so as to supply inflation gas into the inner space of the airbag 120. The airbag 120 is broadly divided into a first folded portion 121, a second folded portion 122, and a third folded portion 123 in order from the base end toward the distal end, and has a so-called hybrid folded structure in which the folded portions are combined together.

More specifically, as shown in FIG. 3, the first folded portion 121 includes a first extending portion 121a extending above the second folded portion 122 at the base end of the airbag 120 and a second extending portion 121b extending vertically along the second folded portion 122 and the third folded portion 123 on the side of the second folded portion 122 and the third folded portion 123 adjacent to the interior of the cabin (interior of the car). The first folded portion 121 is formed by folding back the base end of the airbag 120 at a fold-back portion (a fold-back portion B in FIG. 3) and forms an inverse L-shape with the first extending portion 121a and the second extending portion 121b. The first folded portion 121 extends downward from the base end (in the direction of arrow 10 in FIG. 3) so as to cover the side of the second folded portion 122 and the third folded portion 123 from the interior side (interior of the cabin), and corresponds to an extending portion of the invention. The first extending portion 121a corresponds to the first extending portion of the invention, while the second extending portion 121b corresponds to the second extending portion of the invention.

The second folded portion 122 is constructed as a rolled portion in which the airbag 120 is rolled up (folded) in a roll shape. The second folded portion 122 is rolled up in the direction of arrow 20 in FIG. 3, and has a folded-back portion 122a inside the roll (in the center of the roll). The second folded portion 122 corresponds to a rolled portion of the invention.

The third folded portion 123 is constructed as a concertinas portion in which the 120 is folded up in a concertinas (accordion) shape. The third folded portion 123 corresponds to a concertinas portion of the invention. The second folded portion 122 and the third folded portion 123 constructs the folded portion of the invention.

In the embodiment, as will be described later in detail, when the airbag 120 is deployed, the second folded portion 122 is located in an occupant protection region for covering a head of the occupant. Also, the first folded portion 121 is located above the head of the occupant, and the third folded portion 123 is located below the head of the occupant.

As shown in FIG. 3, the second folded portion 122 of the embodiment is set to be rolled up such that a projection 122b of the fold-back portion 122a faces the sidewall of the vehicle (a side window etc.) when the airbag 120 is inflated. With such a roll-up setting of the second folded portion 122, when the second folded portion 122 deploys in the direction of arrow 10 in FIG. 3, the projection 122b of the fold-back portion 122a is rolled up entirely toward the sidewall of the vehicle.

Figure 4:
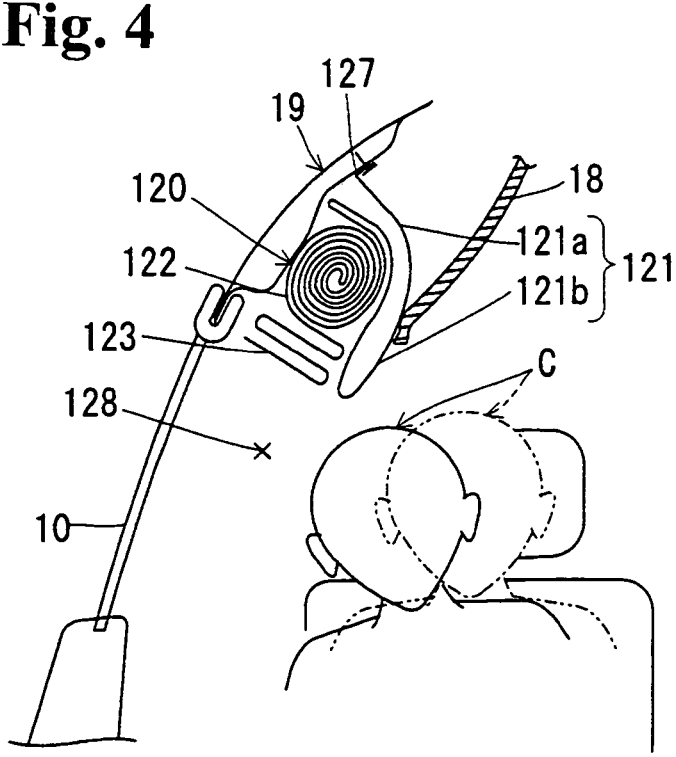
FIG. 4 is a schematic view showing the airbag shown in FIG. 3 during deployment viewed from a front of a vehicle.
Figure 5:
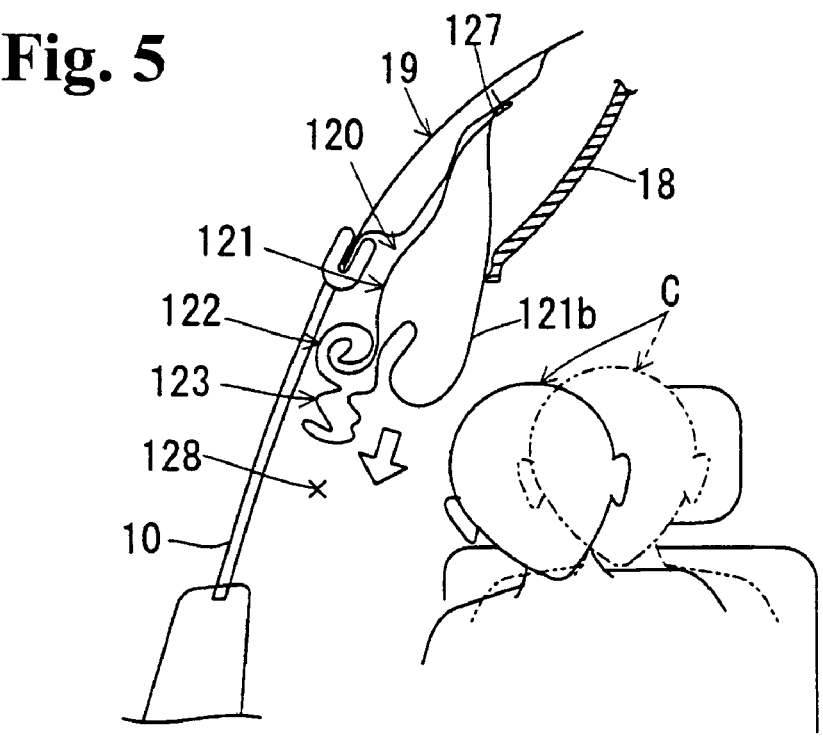
FIG. 5 is a schematic view showing the airbag shown in FIG. 3 during deployment viewed from the front side of the vehicle.
Figure 6:
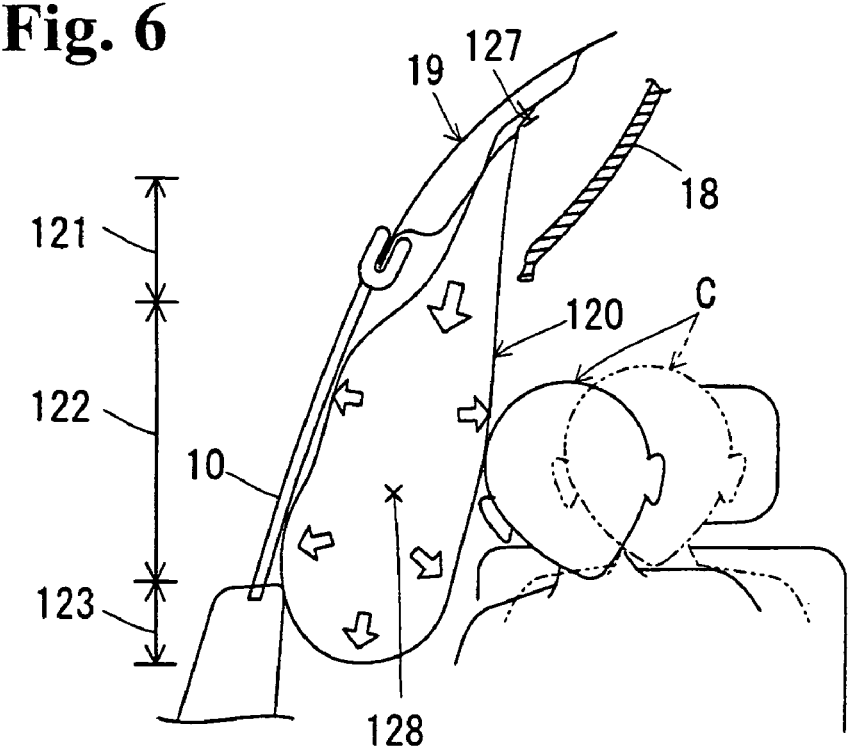
FIG. 6 is a schematic view showing the airbag shown in FIG. 3 at completion of deployment viewed from the front side of the vehicle.
Figure 7:
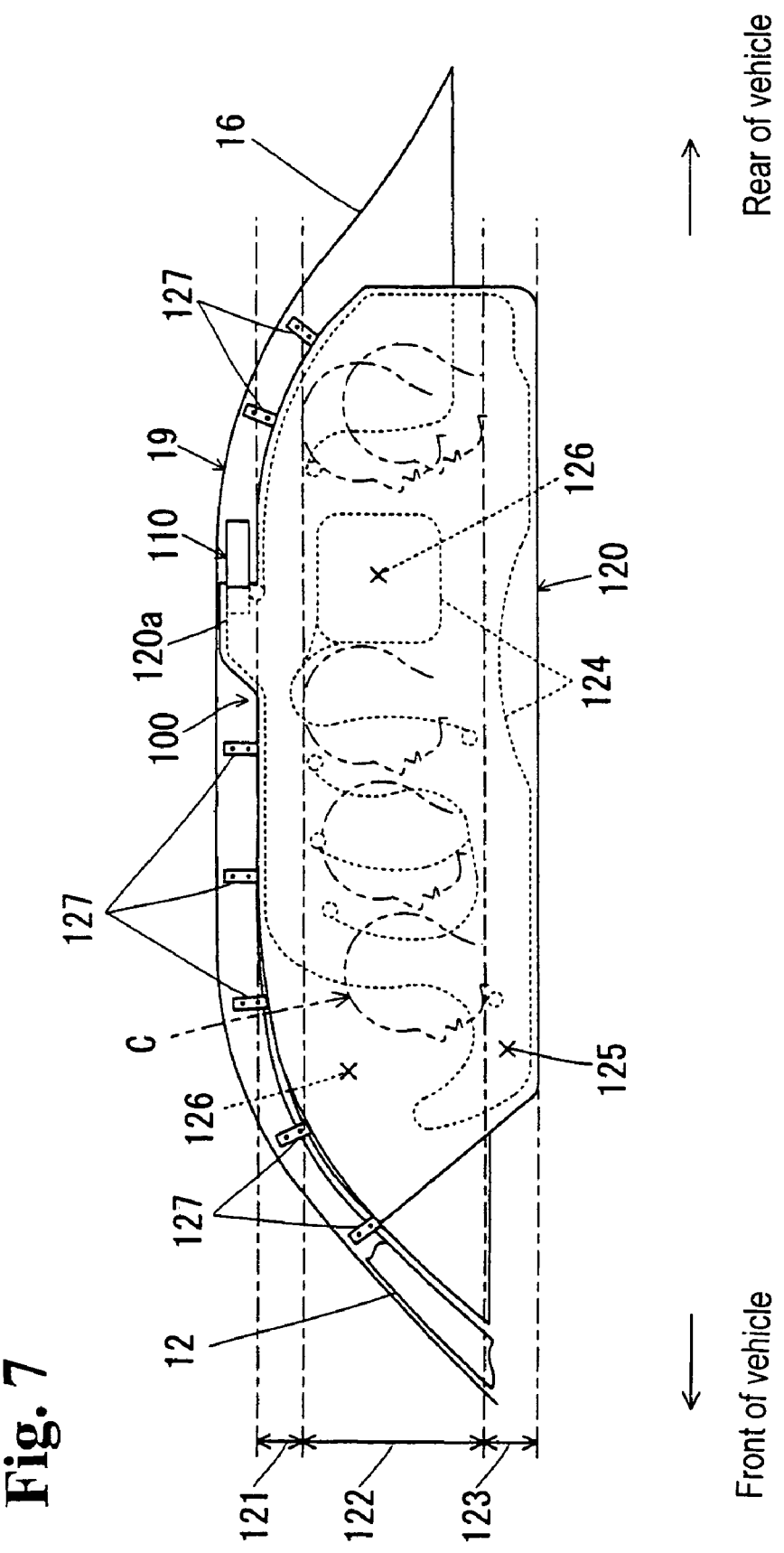
FIG. 7 is a schematic view showing the airbag shown in FIG. 3 at completion of deployment viewed from a side of the vehicle.

An action of the airbag system 100 will be described with reference to FIGS. 4 to 7. FIGS. 4 and 5 show the airbag 120 in FIG. 3 during deployment viewed from the front side of the vehicle. FIG. 6 shows the airbag 120 in FIG. 3 at completion of deployment viewed from the front side of the vehicle. FIG. 7 shows the airbag 120 viewed from a side of the vehicle. In FIGS. 4 to 6, the head of an occupant C before a side crash or rolling sideways is indicated by a phantom line and the head of the occupant C during a side crash or rolling sideways is expressed by a solid line.

In the event of a side crash or turn over, in the initial state, the airbag system 100 is activated to generate inflation gas from the inflator 110 as shown in FIG. 2. The gas is supplied to the inner space of the airbag 120. As shown in FIGS. 4 and 5, the airbag 120 starts inflating (inflating action while deploying) as the inflator 110 operates. The airbag 120 pushes a ceiling panel 18 to open, and is inflated downwardly (deploys downwardly) toward an occupant protection region 128 between a right sidewall (a side window 10) and the occupant C. The first folded portion 121, the second folded portion 122, and the third folded portion 123 are inflated while deploying in the occupant protection region 128 during the inflation of the airbag 120. The occupant protection region 128 is a protection region formed between the occupant C and the sidewall of the vehicle, and corresponds to an occupant protection region of the invention.

In the embodiment, as shown in FIGS. 4 and 5, the first folded portion 121 of the airbag 120 extends downwardly so as to cover the second folded portion 122 and the third folded portion 123 from the interior side of the car (the interior of the cabin). Accordingly, the second folded portion 122 and the third folded portion 123 are restrained from deploying sideward at the upper part of the occupant protection region, while the folded portions are allowed to deploy downwardly. In other words, the sidewall of the vehicle and the first folded portion 121 extend vertically and define both sides of the second folded portion 122 and the third folded portion 123 as a wall that restrains the lateral deployment action of the second folded portion 122 and the third folded portion 123. Accordingly, the airbag 120 preferentially is inflated (deploys) downwardly along the vehicle sidewall toward the occupant protection region 128. The second folded portion 122 and the third folded portion 123 restrained by the first folded portion 121 deploy from the upper part of the vehicle sidewall to the head of the occupant C. This allows a rapid deployment action of the entire airbag 120.

According to the embodiment, the portion of the airbag 120 which covers the head of the occupant C is rolled to form the second folded portion 122. Thus, the airbag 120 can be inflated reliably in the occupant protection region 128 corresponding to the head of the occupant C to obtain high protection effect. Moreover, the projection 122b of the fold-back portion 122a faces the vehicle sidewall when the second folded portion 122 is inflated to cover the head of the occupant C. Accordingly, the fold-back portion 122a of the second folded portion 122 is prevented from getting caught by the occupant C in the process of inflation, thereby smoothly deploying the airbag 120.

The third folded portion 123 of the airbag 120 folded up into the concertinas shape is easily inflated. Accordingly, the third folded portion 123 is quickly inflated in the occupant protection region 128. The rolled portion, i.e., the second folded portion 122, is effective in increasing the occupant protection effect. The concertinas portion is more effective than the rolled portion in inflating the airbag quickly. Accordingly, it is preferable to set a region to be protected by the rolled portion within a minimum range like the head of the occupant.

As shown in FIGS. 6 and 7, the airbag 120 can be inflated quickly and reliably into the space (the occupant protection region 128 in FIG. 6) between the right sidewall (the side window 10) and the head of the occupant C, while the upper part of the airbag 120 is supported by the right side roof rail 19 via the multiple brackets 127. When the airbag 120 is fully inflated, the second folded portion 122 is located in the occupant protection region 128 for covering the head of the occupant C. Also, the first folded portion 121 is located above the head of the occupant C, and the third folded portion 123 is located below the head of the occupant C. The airbag 120 in a fully inflated state is in the form of a curtain for protecting a range from the front pillar 12 to the rear pillar, or a wide range entirely from an occupant sitting in the front seat to an occupant sitting in the rear seat. Thus, the airbag 120 is also referred to as a curtain airbag.

In the embodiment, as shown in FIG. 7, when the airbag 120 is inflated, a vertical length of the second folded portion 122 is set to correspond to different head positions of occupants with various figures such as heights and sitting heights, or different head positions of occupants in different seats such as the front seat and the rear seat. Accordingly, the inflated airbag 120 reliably receives and protects the head of the occupant C moving toward the right sidewall (the side window 10) in a side crash or turnover, thereby securely protecting the occupant C in a side crash or turnover.

The inner space of the airbag 120 is partitioned into an inflating portion 125 and a non-inflating portion 126 by a stitched portion 124. Accordingly, the inflation gas supplied through a gas port 120a is guided regularly in the inner space through a desired flow.

As described above, according to the embodiment, the airbag 120 is provided with the first folded portion 121, so that the second folded portion 122 and the third folded portion 123 are preferentially inflated (deploy) downwardly along the vehicle sidewall toward the occupant protection region 128. Accordingly, in a car accident, it is possible to quickly inflate the airbag 120 into the occupant protection region 128 between the vehicle sidewall and the occupant, thereby securely protecting the head of the occupant C.

According to the embodiment, the first folded portion 121 is formed of the first extending portion 121a and the second extending portion 121b. Thus, the lateral inflating action of the second folded portion 122 and the third folded portion 123 is restrained by the second extending portion 121b, while the upward inflating action is restrained by the first extending portion 121a. This ensures the downward inflating action of the second folded portion 122 and the third folded portion 123 along the vehicle sidewall toward the occupant protection region 128. Also, the rolled-up second folded portion 122 of the airbag 120 can be inflated reliably and smoothly in a protection region corresponding to the head of the occupant.

[Other Embodiments]

The present invention is not limited to the embodiment described above, and various applications and modifications are possible. For example, the following modifications are possible.

In the above embodiment, the airbag system 100 for protecting the occupant C sitting in the right side seat of the vehicle is shown as an example. An airbag system with the same structure as that of the airbag system 100 is also mounted as an airbag system for protecting an occupant sitting in the left side seat of the vehicle. The airbag system has a structure symmetrical to that of the airbag system 100, and is fixed to a left side roof rail.

In the above embodiment, the first folded portion 121 formed of the first extending portion 121*a* and the second extending portion 121*b* is provided in the airbag 120. According to the invention, when the airbag 120 is mounted to the vehicle, it is suffice that the first folded portion 121 covers at least the sides of the second folded portion 122 and the third folded portion 123 from the interior side of the vehicle, and has at least the second extending portion 121*b*.

In the above embodiment, the first folded portion 121 is formed by folding the base end of the airbag 120 at the fold-back portion B. According to the invention, the first folded portion 121 may be formed by folding any portions from the base end to the distal end of the airbag 120 as appropriate.

In the above embodiment, the first folded portion 121, the second folded portion 122, and the third folded portion 123 are arranged in this order from the base end to the distal end of the airbag 120. According to the invention, the arrangement of the folded portions can be varied if necessary. For example, the first folded portion 121, the third folded portion 123, and the second folded portion 122 may be arranged in this order from the base end to the distal end of the airbag 120.

Figure 8:
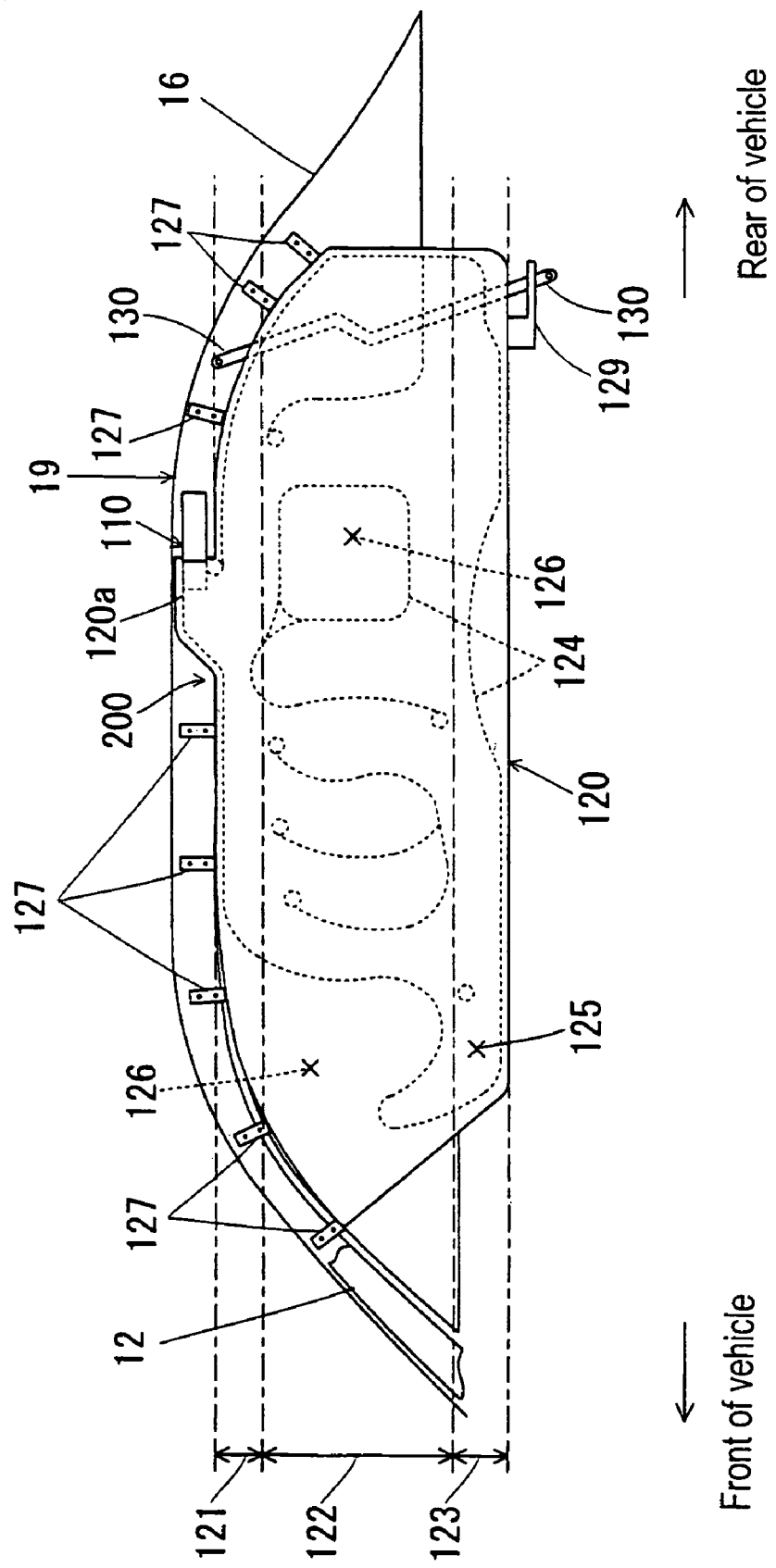
FIG. 8 is a schematic view showing an airbag of an airbag system according to another embodiment at completion of deployment viewed from the side of the vehicle.
Figure 9:
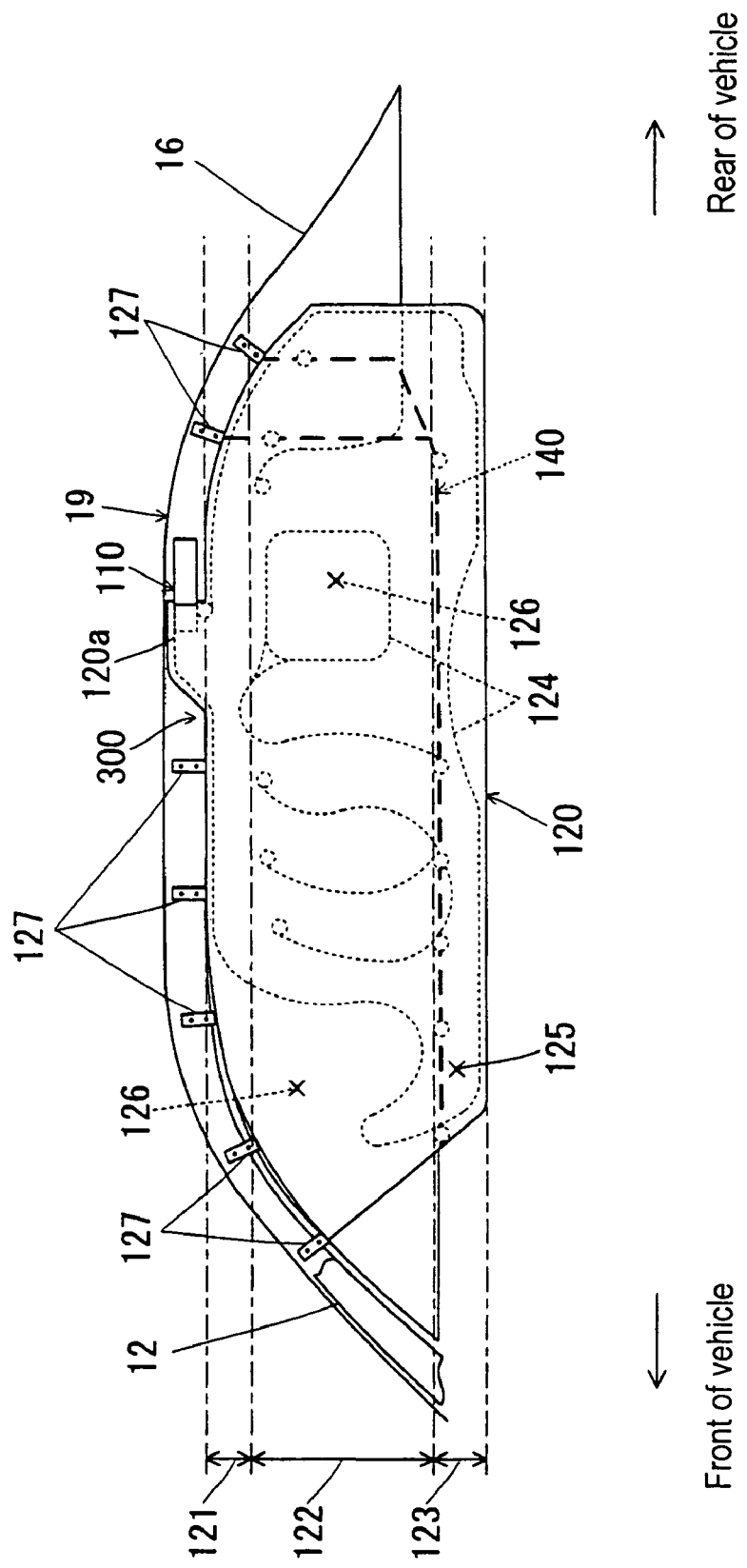
FIG. 9 is a schematic view showing an airbag of an airbag system according to a further embodiment at completion of deployment viewed from the side of the vehicle.

In the invention, an airbag system 200 shown in FIG. 8 or an airbag system 300 shown in FIG. 9 may be provided in place of the airbag system 100 of the above embodiment. Referring to FIGS. 8 and 9, structures of the airbag system 200 and the airbag system 300 will be described. In FIGS. 8 and 9, the same components as those in FIG. 7 are given the same reference numerals, and their detailed descriptions are omitted.

The airbag system 200 shown in FIG. 8 includes a guide member 130 for guiding an end of the airbag 120 adjacent to the rear side of the vehicle downwardly from above along the rear pillar 16. The guide member 130 has an elongated shape and is fixed to the rear pillar 16. A connecting strap (tension strap) 129 of the airbag 120 is looped around the guide member 130, so that the airbag 120 and the guide member 130 are joined together. The connecting strap 129 connected to the guide member 130 prevents the head of the occupant from being thrown out of the car in a car accident. The airbag system shown in FIG. 9 includes a wire 140 for supporting the inflated airbag 120 from the upper part of the vehicle.

In the airbag systems 200 and 300 with such structures, the airbag 120 folded in a shape as in the airbag system 100 is used. Accordingly, the airbag 120 can be inflated quickly and reliably in the occupant protection region 128 between the vehicle sidewall and the occupant, thereby securely protecting the head of the occupant C.

In the above embodiments, the airbag 120 may have various folded structures. FIGS. 10 to 15 show other embodiments of the airbag 120. In the drawings, the same components as those in FIG. 3 are given the same reference numerals.

Figure 10:
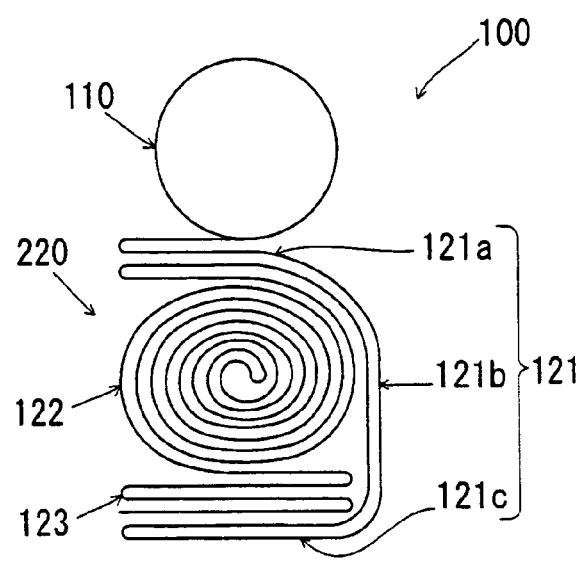
FIG. 10 is a schematic view showing an airbag according to a still further embodiment.

An airbag 220 shown in FIG. 10 has a structure in which the first folded portion 121 further has a third extending portion 121*c*, in addition to the structure of the airbag 120 shown in FIG. 3. The third extending portion 121*c* extends below the third folded portion 123. The first folded portion 121 has a U shape formed of the first extending portion 121*a*, the second extending portion 121*b*, and the third extending portion 121*c*.

Figure 11:
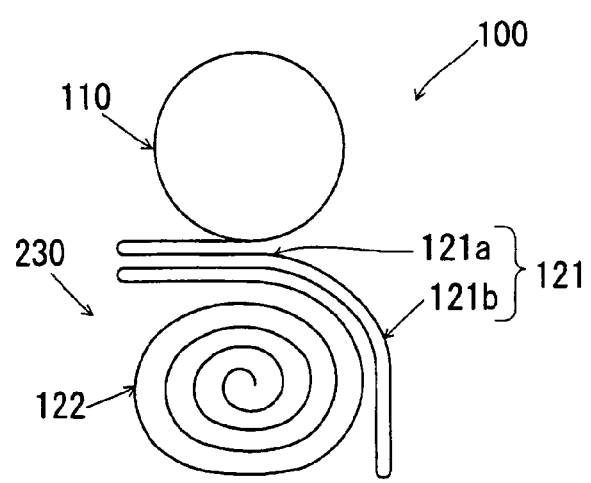
FIG. 11 is a schematic view showing an airbag according to a still further embodiment.

An airbag 230 shown in FIG. 11 has a structure in which the concertina portion such as the third folded portion 123 is omitted from the structure of the airbag 120 shown in FIG. 3.

Figure 12:
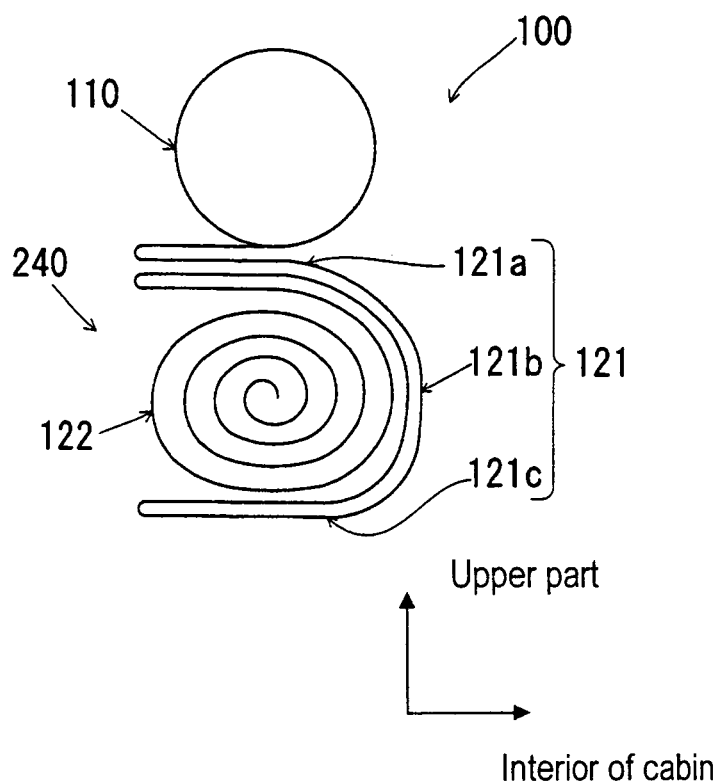
FIG. 12 is a schematic view showing an airbag according to a still further embodiment.

An airbag 240 shown in FIG. 12 has a structure in which the concertina portion such as the third folded portion 123 is omitted from the structure of the airbag 220 shown in FIG. 10.

Figure 13:
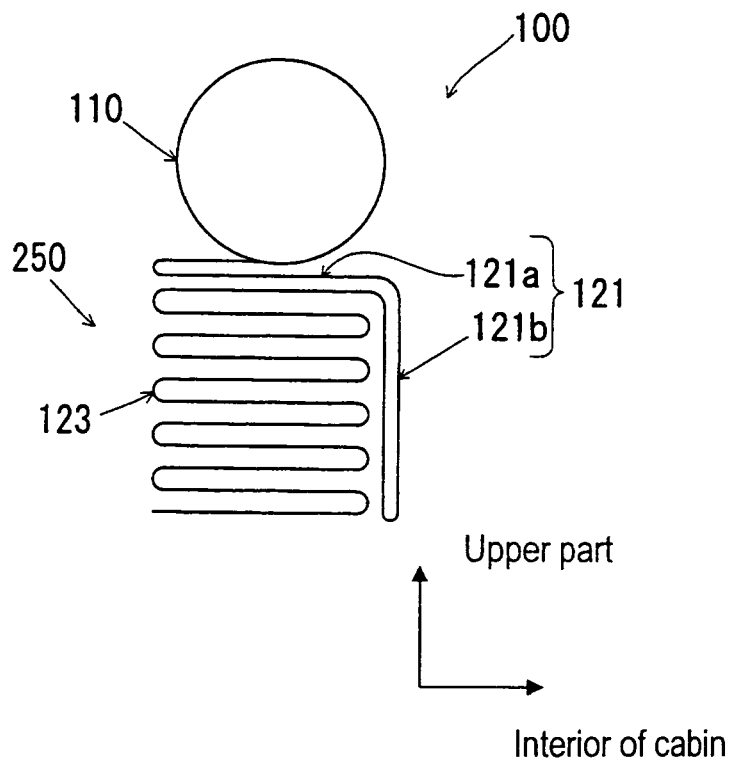
FIG. 13 is a schematic view showing an airbag according to a still further embodiment.

An airbag 250 shown in FIG. 13 has a structure in which the rolled portion like the second folded portion 122 is omitted in the structure of the airbag 120 shown in FIG. 3.

Figure 14:
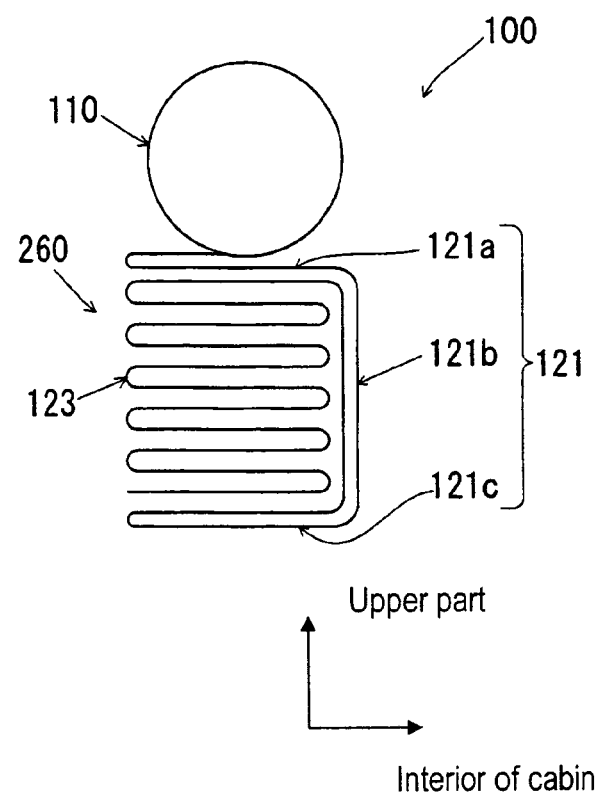
FIG. 14 is a schematic view showing an airbag according to a still further embodiment.

An airbag 260 shown in FIG. 14 has a structure in which the rolled portion such as the second folded portion 122 is omitted from the structure of the airbag 220 shown in FIG. 10.

Figure 15:
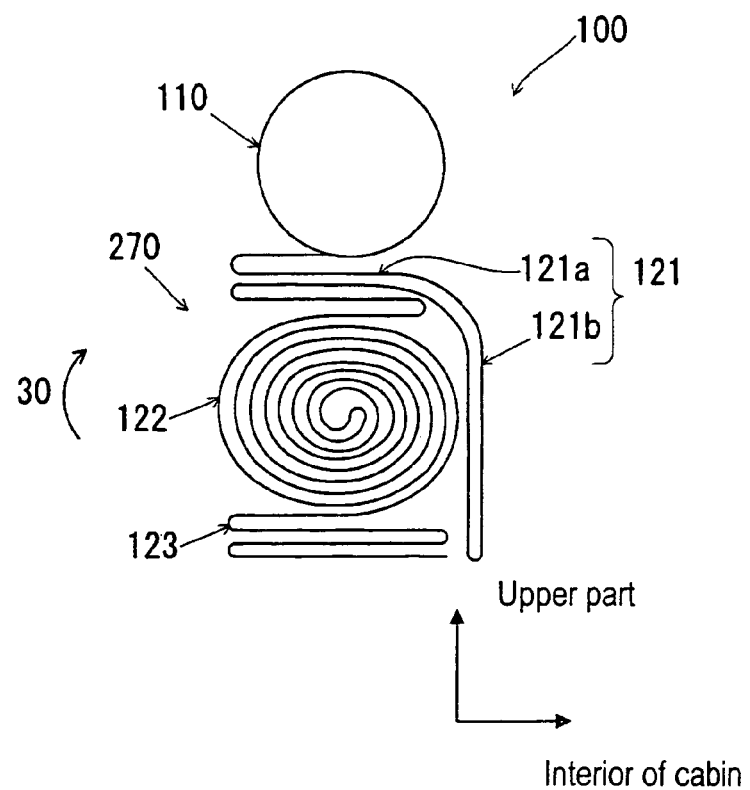
FIG. 15 is a schematic view showing an airbag according to a still further embodiment.

An airbag 270 shown in FIG. 15 has a structure in which the second folded portion 122 is rolled up in the direction of arrow 30 opposite to the arrow 20 in FIG. 3, in the structure of the airbag 120 shown in FIG. 3.

Figure 16:
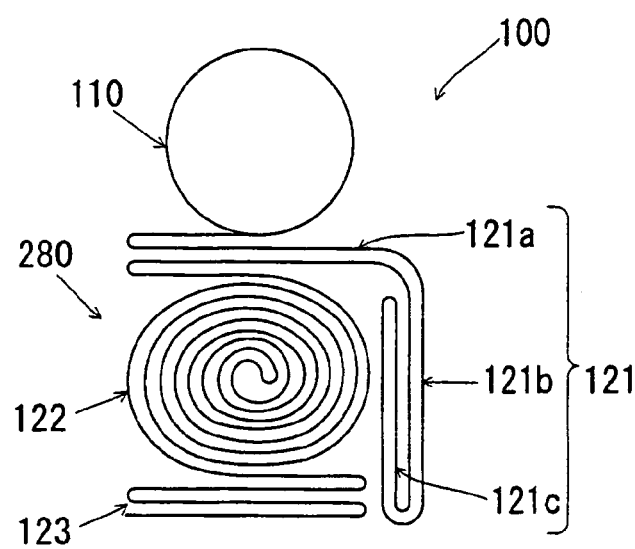
FIG. 16 is a schematic view showing an airbag according to a still further embodiment.

An airbag 280 shown in FIG. 16 has a structure in which the third extending portion 121*c* is folded between the second folded portion 122 and the third folded portion 123, and the second extending portion 121*b* of the first folded portion 121, and extends vertically, in the structure of the airbag 220 shown in FIG. 10. In other words, the third extending portion 121*c* extends downwardly from the base end toward the distal end along the second folded portion 122 and the third folded portion 123 and then extends upwardly along the second folded portion 122 and the third folded portion 123.

Figure 17:
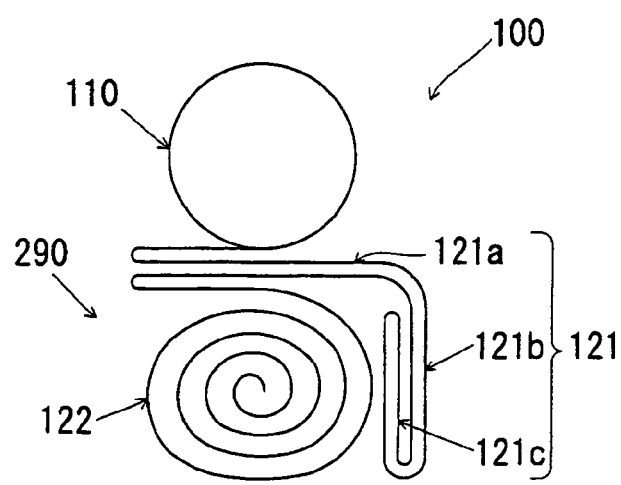
FIG. 17 is a schematic view showing an airbag according to a still further embodiment.

An airbag 290 shown in FIG. 17 has a structure in which the third extending portion 121*c* is folded between the second folded portion 122 and the second extending portion 121*b* of the first folded portion 121, and extends vertically, in the structure of the airbag 240 shown in FIG. 12. In other words, the third extending portion 121*c* extends downwardly from the base end toward the distal end along the second folded portion 122 and then extends upwardly along the second folded portion 122.

Figure 18:
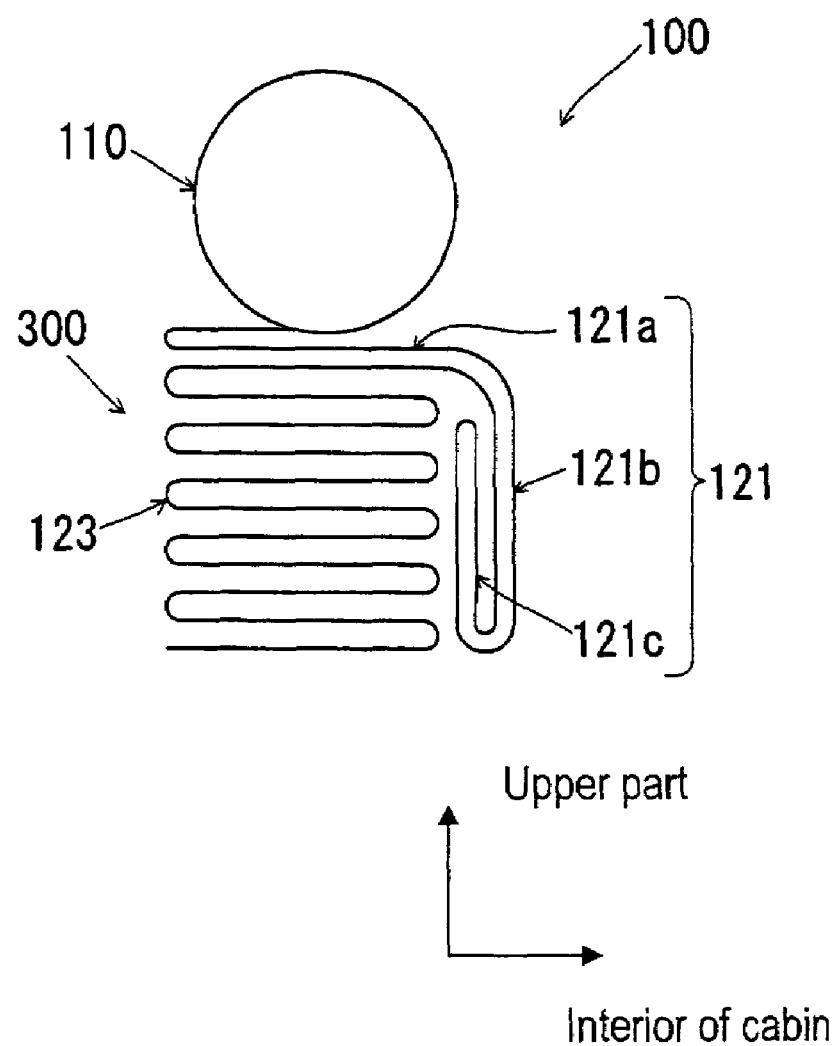
FIG. 18 is a schematic view showing an airbag according to a still further embodiment.

An airbag 300 shown in FIG. 18 has a structure in which the third extending portion 121*c* is folded between the third folded portion 123 and the second extending portion 121*b* of the first folded portion 121, and extends vertically, in the structure of the airbag 260 shown in FIG. 14. In other words, the third extending portion 121*c* extends downwardly from the base end toward the distal end along the third folded portion 123 and then extends upwardly along the third folded portion 123.

The airbags 220, 230, 240, 250, 260, 270, 280, 290, and 300 with such structures offer the same advantages as those of the airbag 120, since the first folded portion 121 includes at least the first extending portion 121*a* and the second extending portion 121*b*. Like the airbag 120, the structures of these airbags can also be applied to the airbag systems 100, 200, and 300.

The airbag system of the invention may be constructed in such a way that the components of the airbag system are mounted to the body of a vehicle in sequence, or alternatively, a module-type airbag system is mounted as a whole to the body of a vehicle.

In the above embodiments, the airbag 120 protects a wide range corresponding to the position of a front seat occupant to the position of a rear seat occupant. According to the invention, the airbag may be divided into multiple airbags. For example, a first airbag and a second airbag can be provided for protecting a front seat occupant and a rear seat occupant, respectively. The structure is effective in inflating the separately arranged airbags at a desired speed. The structure is particularly effective for a vehicle that is long from the front pillar to the rear pillar, thus having a long occupant protection region along the length of the vehicle. In place of the car having two rows of seats as in the embodiments, the airbag systems 100, 200, and 300 according to the embodiments can be mounted to a car with three rows of seats.

In the above embodiments, the airbag systems are mounted to the cars. The invention can also be applied to the structure of airbag systems mounted to various vehicles other than cars such as trains and vessels.

The disclosure of Japanese Patent Application No. 2004-134392, filed on Apr. 28, 2004, is incorporated in the application.

While the invention has been explained with reference to the specific embodiments of the invention, the explanation is illustrative and the invention is limited only by the appended claims.

What is claimed is:

1. An airbag system for protecting an occupant, comprising:
   a gas supply device for supplying inflation gas, and
   an airbag to be mounted above a side of a vehicle to be inflated downwardly into an occupant protection region between the occupant and the side of the vehicle, said airbag having an interior side and an outer side opposite to the interior side when inflated, said interior and outer sides being entirely laminated together for folding, said airbag having a folded portion folded in a predetermined shape and an extending portion between the folded portion and the gas supply device, said extending portion being folded several times between the gas supply device and the folded portion, and extending downwardly along the folded portion for covering only one side of the folded portion at the interior side of the vehicle when the airbag is mounted to the vehicle, said extending portion being adapted to push and open a ceiling panel upon inflation of the airbag to thereby move the folded portion to the occupant protection region along a side window of the vehicle at an uninflated condition so that the folded portion is inflated at the occupant protection region,
   wherein said extending portion includes a first extending portion located above the folded portion, a second extending portion extending along the only one side of the folded portion, and a third extending portion continuously attached to the folded portion and pleated several times and located under the folded portion so that the third extending portion completely covers a lower half of the folded portion, and
   wherein said first extending portion is connected to the gas supply device, and the second extending portion is disposed adjacent the first extending portion and the folded portion and covers the only one side of the folded portion.

2. An airbag system according to claim 1, wherein said folded portion is located under the first extending portion when the airbag is deployed so that the folded portion starts to deploy after the first and second extending portions deploy.

3. An airbag system according to claim 1, wherein said folded portion includes a rolled portion rolled in a roll shape so that the rolled portion is inflated in a region corresponding to a head of the occupant in the occupant protection region while being restrained by the extending portion from deploying directly towards the head of the occupant from above a vehicle sidewall.

4. An airbag system for protecting an occupant, comprising:
   a gas supply device for supplying inflation gas, and
   an airbag to be mounted above a side of a vehicle to be inflated downwardly by the inflation gas of the gas supply device into an occupant protection region between the occupant and the side of the vehicle, said airbag having an interior side and an outer side opposite to the interior side when inflated, said interior and outer sides being entirely laminated together for folding, said airbag having, in a folded state, a folded portion rolled inwardly so that a center of the folded portion is in a middle of the airbag and having an end portion located outside the folded portion, and an extending portion attached to the folded portion at a side close to the gas supply device, said extending portion including a first extending portion pleated several times and located above the folded portion, a second extending portion extending continuously downwardly from the first extending portion along the folded portion for covering one side of the folded portion at the interior side of the vehicle and then upwardly along the folded portion to be connected to the folded portion at an upper portion thereof, and a third extending portion as the end portion extending from the folded portion, said third extending portion being pleated several times and located under the folded portion.

5. An airbag system according to claim 4, wherein said extending portion entirely covers the only one side of the folded portion so that the folded portion is pushed toward the side of the vehicle by the extending portion when the inflation gas is supplied to the airbag.

6. An airbag system according to claim 4, wherein said second extending portion includes a portion located under the folded portion.

7. An airbag system for protecting an occupant, comprising:
   a gas supply device for supplying inflation gas, and
   an airbag to be mounted above a side of a vehicle to be inflated downwardly into an occupant protection region between the occupant and the side of the vehicle, said airbag having an interior side and an outer side opposite to the interior side when inflated, said interior and outer sides being entirely laminated together for folding, said airbag having a folded portion folded in a predetermined shape and an extending portion between the folded portion and the gas supply device, said extending portion being folded several times between the gas supply device and the folded portion, and extending downwardly along the folded portion for covering only one side of the folded portion at the interior side of the vehicle when the airbag is mounted to the vehicle, said extending portion being adapted to push and open a ceiling panel upon inflation of the airbag to thereby move the folded portion to the occupant protection region along a side window of the vehicle at an un-inflated condition so that the folded portion is inflated at the occupant protection region, wherein said extending portion includes a first extending portion located above the folded portion and a second extending portion extending along the only one side of the folded portion, wherein said first extending portion is connected to the gas supply device, and the second extending portion is disposed adjacent the first extending portion and the folded portion and covers the only one side of the folded portion, wherein said folded portion is located under the first extending portion when the airbag is deployed so that the folded portion starts to deploy after the first and second extending portions deploy, and wherein said folded portion is a pleated portion laminated under the first extending portion folded several times.

8. An airbag system according to claim 7, wherein said extending portion further includes a third extending portion folded and located between the second extending portion and the folded portion.

9. An airbag system according to claim 7, wherein said extending portion further includes a third extending portion located under the folded portion.

* * * * *